D. McERLANE.
FITMENT FOR ADJUSTABLE COUCH ENDS, CHAIR BACKS, AND THE LIKE.
APPLICATION FILED JUNE 24, 1916.

1,238,035.

Patented Aug. 21, 1917.
2 SHEETS—SHEET 1.

INVENTOR
David McErlane
BY Stinson and Stinson
ATTORNEYS

D. McERLANE.
FITMENT FOR ADJUSTABLE COUCH ENDS, CHAIR BACKS, AND THE LIKE.
APPLICATION FILED JUNE 24, 1916.

1,238,035.

Patented Aug. 21, 1917.

INVENTOR
David McErlane

By [signature]
ATTORNEYS

UNITED STATES PATENT OFFICE.

DAVID McERLANE, OF SPRINGBURN, GLASGOW, SCOTLAND.

FITMENT FOR ADJUSTABLE COUCH ENDS, CHAIR-BACKS, AND THE LIKE.

1,238,035.  Specification of Letters Patent.  Patented Aug. 21, 1917.

Application filed June 24, 1916. Serial No. 105,700.

*To all whom it may concern:*

Be it known that I, DAVID McERLANE, a subject of the King of Great Britain and Ireland, and a resident of Springburn, Glasgow, Scotland, have invented a certain new and useful Improved Fitment for Adjustable Couch Ends, Chair-Backs, and the like, of which the following is the specification.

The invention has for its object to provide for couch-ends chair-backs and the like, a fitment permitting of their adjustment and securely holding them when adjusted at any of a series of angular positions, the improved fitment not only being more rigid and stronger than those hitherto generally used, but also permitting of a greater variety of positions. The improved device is also applicable to other hinged parts such as windows, box or like lids, trap doors and the like.

Figure 1:
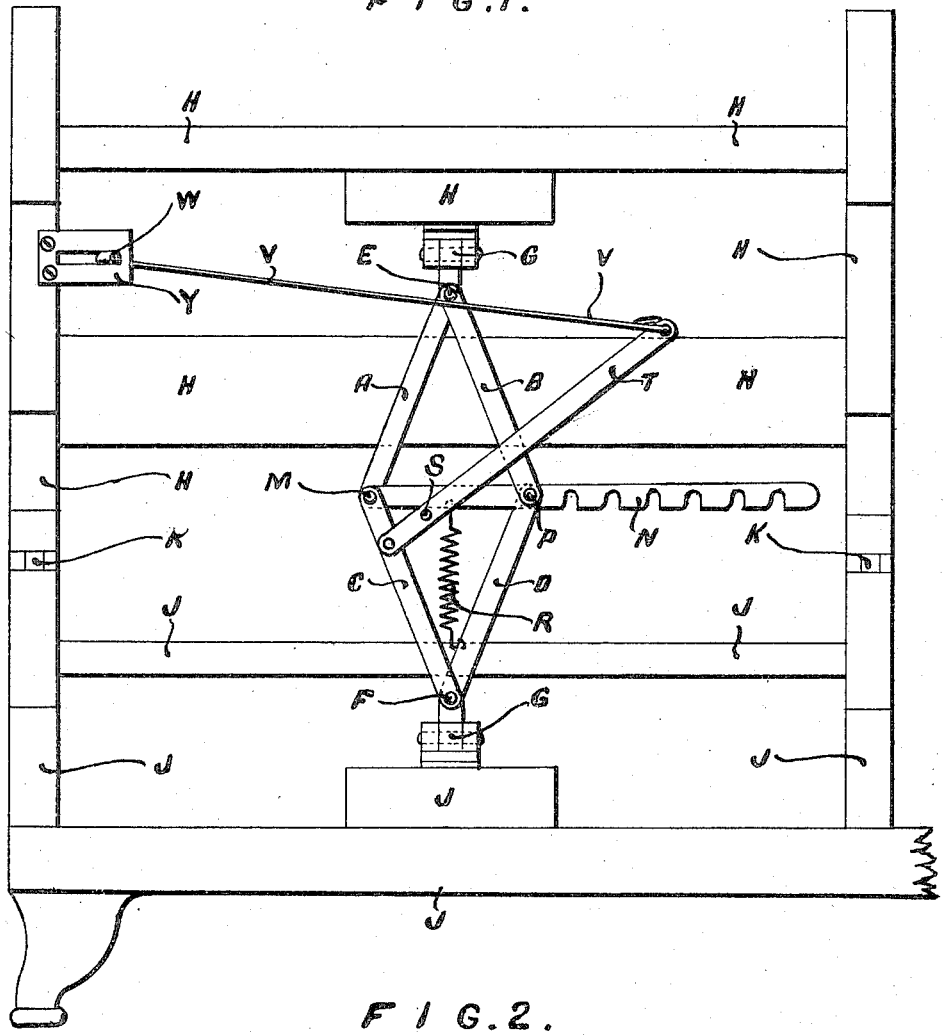
Figure 2:
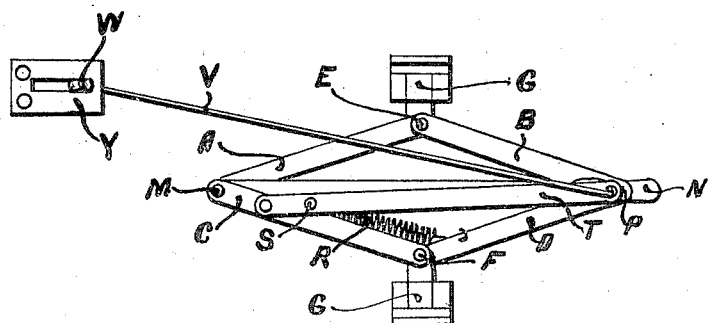
Figure 3:
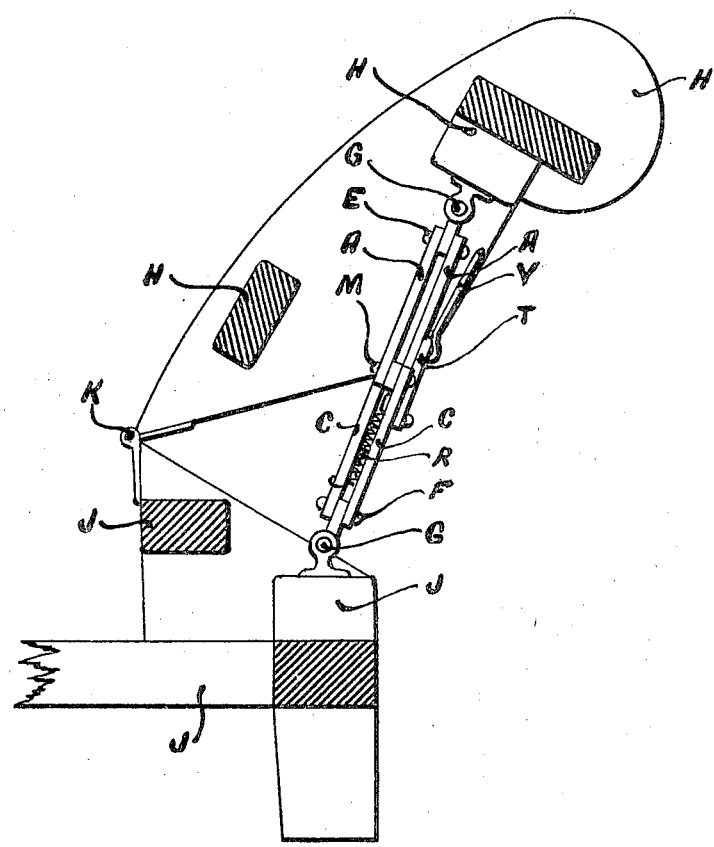

A complete device made according to this example is illustrated as applied to a couch-end on two accompanying sheets of explanatory drawings, wherein Figure 1, Sheet 1, is an end elevation of a couch with the device applied to it and in one position, Fig. 2 showing also in elevation the device in a second position, while Fig. 3, Sheet 2, is a sectional side elevation of a couch end with the device.

In this example, the four links A, B, C, D are pivoted together, the upper and lower pivot pins E, F engaging hinge members G permitting of substantially universal movement, and secured, the upper to the framing H of the couch end, and the lower to the framing J of the couch, which parts are connected as usual by hinges K.

In order to control the position of the device and so the angle of the couch-end, there is pivoted on one of the lateral pivot pins M of the linkage, a rack bar N having in it notches adapted to engage the other lateral pivot pin P of the linkage. This rack bar is controlled by a spring R, and is operated for release by a pin S on a lever T pivoted on one of the links, and connected by a link V with a handled lever W pivoted on the couch-end and working in a small quadrant Y thereon.

In order that the angle of the couch-end may be adjusted, the lever W is pulled, so moving the lever T, carrying the pin S on which engages the rack bar N, and lifts said rack bar out of engagement with the pivot pin P. The couch-end is then moved to the desired angle and the lever W released, whereupon the rack bar N reëngages the pin P and holds the linkage and so the couch-end securely in position.

The couch-end is shown in Figs. 1 and 3 in fully raised position—the notch for this position in the rack bar N is of such form that the back is locked. In Fig. 2 the device is shown collapsed as when the couch-end is practically horizontal.

What I claim is:—

1. In a chair, couch or the like, a frame, a back rest hinged thereto, a four-link parallelogram lazy-tongs support for said back rest collapsible in a plane substantially parallel thereto, hinged connections at the top and bottom of said support connecting the same to the back rest and frame respectively and permitting said support to move with the back rest, together with an adjustable latching bar extending between and engaging the legs of the lazy-tongs and means for temporarily freeing said latching bar to permit angular adjustment of the back rest, substantially as described.

2. In a construction such as specified in claim 1, a spring for normally holding the latching bar in engaging position.

3. In a construction such as specified in claim 1, a latching bar pivoted at the joint between the links of one leg of the lazy-tongs and engaging the pivot pin of the joint between the links of the opposite leg, substantially as described.

4. In a construction such as specified in claim 1, an operating connection for the latch-freeing means, extending to the side of the back rest, substantially as described.

5. In a construction such as specified in claim 1, latch freeing means, comprising a lever pivoted to one of the links and engaging the latching bar.

6. In a construction such as specified in claim 5, a connection extending from said lever to the side of the back rest for operating the lever.

In testimony whereof I have signed my name to this specification, in the presence of two subscribing witnesses.

DAVID McERLANE.

Witnesses:
DAVID FERGUSON,
JAMES EAGLESOM.